(No Model.) 2 Sheets—Sheet 1.
A. N. PARRY.
SHIFTING SEAT FOR CARRIAGES.
No. 494,794. Patented Apr. 4, 1893.
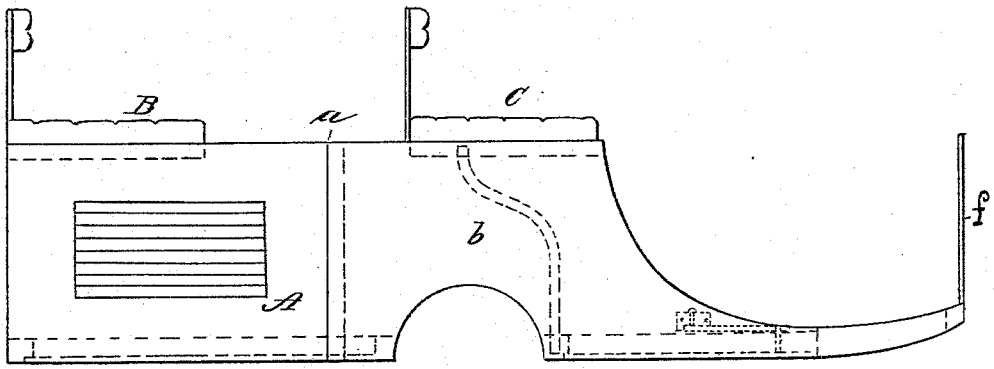
_Fig. 1._
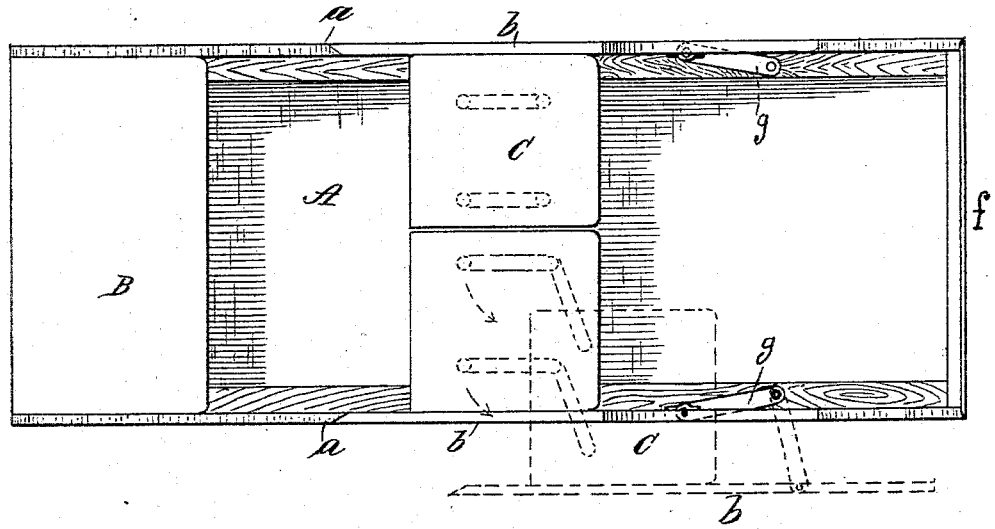
_Fig. 2._
Witnesses
James D. Thomson
H. C. Renwick Jr.
Inventor
Augustus N. Parry
for T. W. Porter Atty (No Model.) 2 Sheets—Sheet 2.

A. N. PARRY.
SHIFTING SEAT FOR CARRIAGES.

No. 494,794. Patented Apr. 4, 1893.

Witnesses.

Inventor.
Augustus N. Parry
per T. W. Porter Atty

UNITED STATES PATENT OFFICE.

AUGUSTUS N. PARRY, OF AMESBURY, MASSACHUSETTS.

SHIFTING SEAT FOR CARRIAGES.

SPECIFICATION forming part of Letters Patent No. 494,794, dated April 4, 1893.

Application filed October 7, 1892. Serial No. 448,119. (No model.)

*To all whom it may concern:*

Be it known that I, AUGUSTUS N. PARRY, of Amesbury, in the county of Essex and State of Massachusetts, have invented a new and useful Improvement in Carriages, which will, in connection with the accompanying drawings, be hereinafter fully described, and specifically defined in the appended claims.

Figure 3:
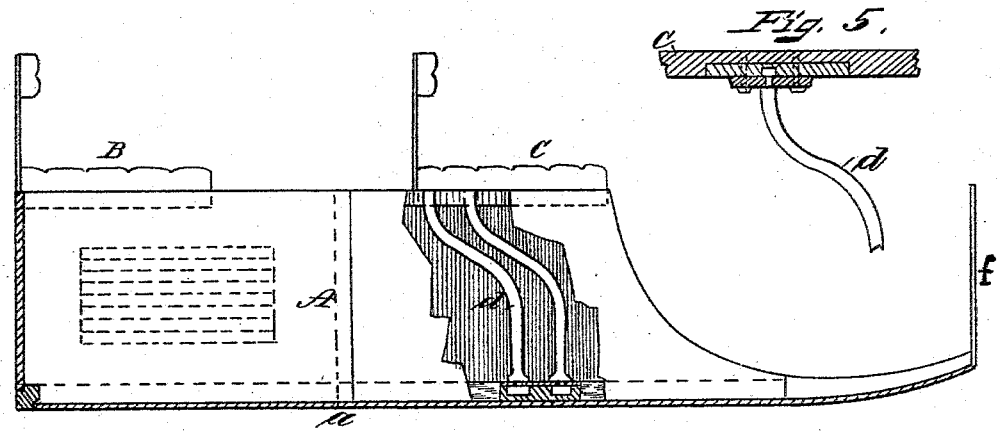
Figure 4:
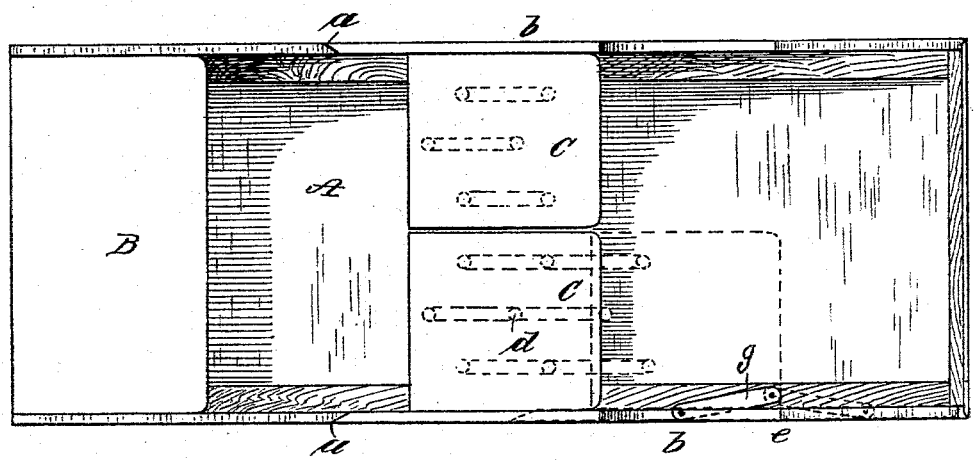

In said drawings Figure 1 represents a side elevation of a carriage body, formed with a wheel house, and a front and rear seat; the front seat being supported upon bent rods, according to my method, so as to be swung outward and to the front, to allow entrance to and exit from the rear seat. Fig. 2 shows the same vehicle in top plan view with the right hand seat swung outward and partly forward. Fig. 3 is a side elevation of a body having a continuous sill, with its seats; and with my invention thereto applied; the side panel being in part broken away to show the supporting rods of the front seat. Fig. 4 shows the body and seats of Fig. 3, but with the right hand half of the front seat moved forward to allow entrance to and exit from the rear seat, and Fig. 5 is a detached view, showing a method of attaching the ends of the jumping irons to the seat and body.

The object of my invention is to provide a quick and easy means of moving the front seat of a two seat vehicle forward to the requisite extent to allow passengers to enter and leave the vehicle, between the rear end of the front seat, and the rear seat, when the front seat is so moved forward. And the invention consists in mounting the halves of the front seat upon rods, practically vertical, that are bent to the rear, as when the seat is closed; but which will be bent to the front when the seat is opened; said rods being pivotally attached to the seat and body.

Referring again to said drawings, A represents the carriage body and B the rear seat; both of which may be of any desired construction adapted to my invention. The front seat is shown as formed in two halves C, C, divided in the longitudinal line of the carriage. Said halves C are formed with side panels *b*, which separate from the rear panel at *a* when the front seat swings forward. Said halves of the front seat are supported upon the curved rods *d*, which at their top are pivotally connected with said halves C, and at their lower end are similarly secured to the floor of the body. A convenient method of so securing them is shown in Fig. 5, which shows the upper portion of one of said rods. When using this invention with carriages having wheel houses, as in Figs. 1 and 2, but two of such rods will usually be requisite; while if using them in continuous sill carriages, as in Figs. 3 and 4, three of said rods may be employed. But there is no reason why a greater or less number may not be used if preferred. The side *b* of seat C can terminate at *e*, when in its rear-most position, so that when moved forward it will not project beyond dasher *f*. It will be obvious that the occupant of either half of the front seat will only have to place his hand upon the other half and move it quickly forward whenever necessary. If desired, a lock or catch may be connected with the halves of the front seat, so that it cannot move unless such lock is first released; and if desired a device may be attached to it so that it cannot wear down out of place, as shown at *g*. The amount of curve of irons *d* is half the distance the front seat is to be moved to the front, as will be obvious at a glance.

Many variations and changes in applying my invention may be made without departing from the spirit thereof, which consists essentially in pivotally supporting and moving the halves C of the front seat upon the bent rods *d*, arranged to swing outward as specified.

I claim as my invention—

1. The front seat of a carriage arranged upon bent rods pivoted to said seat and to the bottom of the body, whereby the front seat can be swung outward, substantially as specified.

2. The combination of body A, the front seat C, and bent rods *d*, pivoted to said body and seat, so that the seat can be moved outward when supported on said rods, substantially as specified.

AUGUSTUS N. PARRY.

Witnesses:
   GEO. H. BRIGGS,
   DELL W. DOETIER.